(12) United States Patent
Sautter et al.

(10) Patent No.: US 6,992,730 B1
(45) Date of Patent: Jan. 31, 2006

(54) PROCESS FOR MOBILE RECEPTION OF TELEVISION SIGNALS AND A CIRCUIT FOR EXECUTING THE PROCESS

(75) Inventors: Wolfgang Sautter, Reutlingen (DE); Achim Ratzel, Ettlingen-Schöllbronn (DE); Dieter Schenkyr, Lenningen (DE)

(73) Assignee: Hirschmann Electronics GmbH & Co. KG, Neckartenzlingen (DE)

( * ) Notice: Subject to any disclaimer, the term of this patent is extended or adjusted under 35 U.S.C. 154(b) by 0 days.

(21) Appl. No.: 10/018,364

(22) PCT Filed: May 20, 2000

(86) PCT No.: PCT/EP00/04553

§ 371 (c)(1),
(2), (4) Date: Mar. 8, 2002

(87) PCT Pub. No.: WO01/01598

PCT Pub. Date: Jan. 4, 2001

(30) Foreign Application Priority Data

Jun. 25, 1999 (DE) ................................ 199 29 284

(51) Int. Cl.
*H04N 5/44* (2006.01)
(52) U.S. Cl. .................. 348/725; 348/553; 348/555; 348/516; 455/345; 455/135; 375/349
(58) Field of Classification Search ................ 348/725, 348/726, 731, 555, 553, 516; 455/344–346, 455/272–279.1, 132–137; 375/349, 347, 375/359
See application file for complete search history.

(56) References Cited

U.S. PATENT DOCUMENTS

| | | | | |
|---|---|---|---|---|
| 4,079,318 A | * | 3/1978 | Kinoshita | .................... 455/139 |
| 5,159,707 A | | 10/1992 | Mogi et al. | |
| 5,465,271 A | | 11/1995 | Hladik et al. | |
| 5,513,222 A | * | 4/1996 | Iwasaki | ...................... 375/347 |
| 5,528,581 A | | 6/1996 | De Bot | |
| 5,697,083 A | * | 12/1997 | Sano | ....................... 455/276.1 |
| 5,933,466 A | * | 8/1999 | Oshima et al. | ............. 375/347 |

FOREIGN PATENT DOCUMENTS

| | | |
|---|---|---|
| DE | 38 33 709 | 4/1990 |
| DE | 39 26 336 | 2/1991 |
| DE | 43 24 304 | 1/1995 |
| DE | 197 08 996 | 9/1997 |
| DE | 196 36 125 | 3/1998 |
| DE | 197 39 898 | 3/1999 |
| EP | 0 767 554 | 4/1997 |
| JP | 8-23484 | * 1/1996 |

* cited by examiner

*Primary Examiner*—John Miller
*Assistant Examiner*—Jean W. Désir
(74) *Attorney, Agent, or Firm*—Fulbright & Jaworski L.L.P.

(57) ABSTRACT

Process for mobile reception of television signals in which an output signal ($S_A$) is derived from n different ($S_1 \ldots S_5$) and is supplied to the reproduction part of the receiver, the n input signals ($S_1 \ldots S_5$) being weighted, the output signal ($S_A$) being formed by summing of the weighted input signals, and the quality of each of the n input signals ($S_1 \ldots S_5$) being evaluated using at least one given criterion for determining the adaptively determined weighting factors, characterized in that the n input signals ($S_1 \ldots S_5$) are time-synchronized before their evaluation, summing and weighting, and the horizontal and/or vertical video synchronization pulses contained in the input signals ($S_1 \ldots S_5$) are used for control of time synchronization.

20 Claims, 1 Drawing Sheet

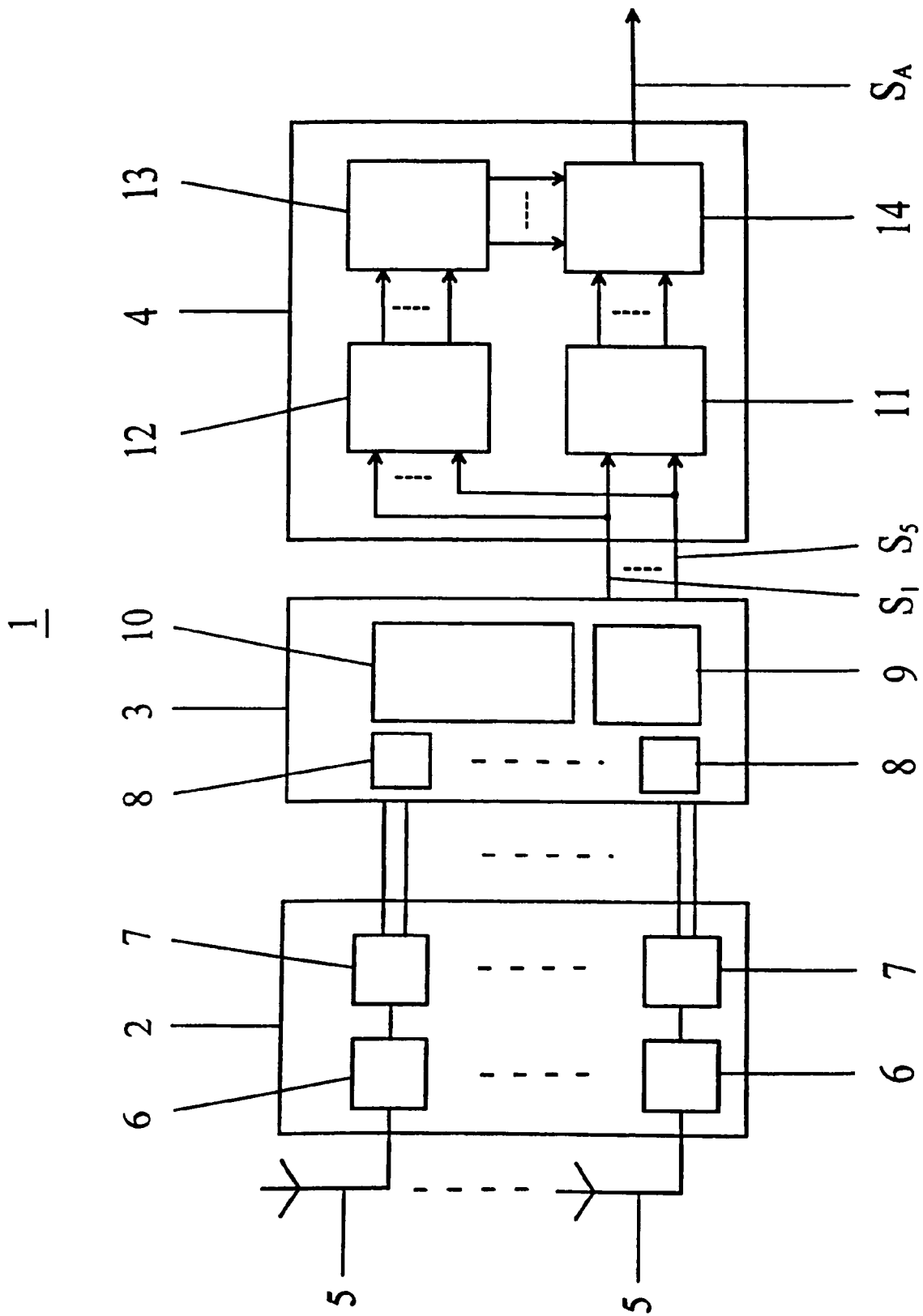

PROCESS FOR MOBILE RECEPTION OF TELEVISION SIGNALS AND A CIRCUIT FOR EXECUTING THE PROCESS

BACKGROUND OF INVENTION

1. Field of the Invention

The present invention relates to a process for mobile reception of broadcast signals and a circuit for executing the process. More particularly, the present invention relates to a process and circuit for mobile reception of television.

2. Description of the Related Technology

Formation of an output signal which is supplied to the receiver by summing of input signals weighted according to quality criteria is already known from documents U.S. Pat. No. 5,528,581, DE 38 33 709 A1, DE 197 08 996 A1 and U.S. Pat. No. 5,465,271.

Compared to other methods of multipath reception, as are known from DE 39 26 336 A1, DE 196 36 125 A1 and DE 197 39 898 A1, in which at any time only the use of one (the best) individual signal is enabled and thus the output signal supplied to the receiver is at most as good as the best input signal, an improvement can be achieved compared to the best input signal by addition of weighted input signals.

This advantage however can only be achieved when the transit time differences of the received television (signals generally caused by different propagation paths) are determined and equalized before their addition. Without this compensation, as is the case in the diversity transmission system described in U.S. Pat. No. 5,528,581, the acquired useful information is not improved, but degraded.

Generally a path difference and thus a transit time difference of the received signals occur on different propagation paths of a signal. By summing of reception signals the received useful information is not improved, but degraded. It is therefore necessary to determine and equalize the transit time differences before addition.

Transit time equalization is not disclosed in U.S. Pat. No. 5,528,581.

In the diversity process of DE 38 33 709 A1, first the respective phase of the HF carrier oscillations of the various reception signals is determined and then phase correction is done for compensation of transit time differences.

Instead of the phases of the HF signals, also those of the pertinent IF signals can be determined and thus delay correction circuits can be controlled, as is the case in the diversity process according to DE 197 08 996 A1.

The phase synchronization however has the disadvantage which is serious for practical use that the determined phase differences of the HF(IF) signals are always in the range between 0 and $2\pi$. A phase shift of $2\pi$ corresponds to a time shift by the period duration T of the corresponding carrier oscillation. If between the reception signals time shifts larger than the period duration T occur, they are no longer correctly equalized and addition does not lead to an improvement in quality. This process, also called "PCD" (phase controlled diversity), would only allow equalization of alternate routes up to 0.35 m for example at a receiving frequency of 855 MHz. When PCD is used in current television, for very small path differences non-pertinent image contents would therefore be added and thus cause incorrect video reproduction.

Synchronization of the individual reception signals to one another is possible correctly only when the transmitted useful information itself is used to control synchronization. In U.S. Pat. No. 5,465,271, a digital communications system is described in which digital message bits are transmitted. Here the digital message is organized in frames and slots which contain a preamble. This is a special bit sequence which is known to the receiver. In this way the receiver can compare the received data to the data sequence known to it beforehand and can shift the individual reception signals to one another accordingly.

This known type of synchronization cannot be used in transmission of analog television signals since they have no frames, slots and preambles. Otherwise in this communications system the "preambles" of the input signals can be decoded to a sufficient degree and evaluated in the receiver only when the input signals are undisturbed and have little noise. For weak input signals however this is not the case so that this type of synchronization is not suited for a process of the initially mentioned type.

SUMMARY OF INVENTION

An object of the invention is to provide a process for mobile reception of television signals in which reception is enabled or further improved even in multipath propagation, regardless of the length of the alternate routes and thus the magnitude of the transit time differences and in areas with low reception levels.

According to this object of the invention there is provided a process for mobile reception of broadcast signals in which an output signal ($S_A$) is derived from a number (n) of different input signals (i.e. $S_1 \ldots S_5$) and is supplied to the reproduction part of a receiver. In accordance with one aspect of the invention, the input signals ($S_1 \ldots S_n$) are weighted and the output signal ($S_A$) is formed by summing the weighted input signals. For weighting, the quality of each of the input signals ($S_1 \ldots S_n$) is evaluated using at least one criterion which can be set for determining the adaptively determined weighting factors. According to this aspect, the n input signals ($S_1 \ldots S_5$) are time synchronized before their evaluation, summing and weighting. Horizontal and/or vertical video synchronization pulses contained in the input signals ($S_1 \ldots S_5$) may be used for control of time synchronization.

In this process with "time synchronization", the transit time difference of the reception signals is determined using the contained useful information and not using the phase angle of the carrier signal. By using deterministic signal portions, specifically the horizontal and vertical video synchronization pulses of the television signal, this can be done easily. The useful signals are then delayed against one another such that these signal portions (known beforehand) hit one another. The limit of the transit time equalization is no longer the period duration T of the carrier signal, but depends only on the type of deterministic signal portions contained (for example, their spacing) and the available memory.

This yields the advantage that at any time and essentially regardless of the size of the alternate signal routes and thus of the terrain traversed, on all input signals, the same useful information for weighting and summing is available.

The use of the vertical and horizontal video synchronization pulse contained in the transmitted television signal for controlling transit time equalization conversely has the advantage (which is very important for practical use) that, based on the reliable decodability of the video synchronization pulses, even for very weak reception signals, the required transit time equalization can be done even under poor reception conditions. Thus, under difficult conditions as often occur in practice, constructive weighted addition is enabled which leads decisively to improvement in the reception quality of the television picture.

The invention relates to mobile reception of television signals. In addition to video content, data such as teletext are also transmitted. It would be conceivable to decode these data and to use the "frame/slot/preamble" to control synchronization similarly to U.S. Pat. No. 5,465,271. But this would have the major disadvantage that decoding of digital information transmitted at the same time (like teletext) is possible only under very good receiving conditions. For this case however, weighted addition is no longer necessary, since then the receiving quality is good anyway.

Other advantageous embodiments of the present invention are set forth in the claims.

According to one aspect of the invention, a time interval, and thus a certain amount of data, can be stipulated for evaluation of n input signals. Thus a favorable compromise which can be adapted to the circumstances of the individual case between the attainable speed of the process and sufficient evaluation reliability is possible.

According to another aspect of the invention, delay of the input signals ensures that correct weighting of the signals is done when the result of evaluation changes according to the evaluation time intervals.

Simple implementation of this delay can be achieved for example by so-called FIFO (first-in first-out) memories.

In accordance with a further aspect of the invention signal processing, therefore synchronization, signal evaluation and weighting, storage, multiplication and summation, can be accomplished especially easily and effectively when the input signals are digital signals.

In a presently preferred embodiment, each input signal ($S_1 \ldots S_n$) is received with its own antenna. According to this embodiment, with multipath reception in motor vehicles, the output signals of the tuners form the input signals for the following signal processing unit.

The invention contemplates various alternatives for preparing digital input signals in a multiantenna reception system. For example, high frequency signals received with antennas may already be digitally modulated. On alternatively, for example, television signals may be analog and digital input signals ($S_1 \ldots S_n$) with luminance and chrominance portions produced by video decoders connected in series to tumors.

By evaluating the different signal portions of each input signal, and specifically the luminance and the chrominance portions, the brightness and color signal of the various reception signals which is best at the time can be used for weighted summing.

The separation of the luminance and chrominance signal makes it possible for the two signals to be evaluated independently of one another, therefore criteria which are optimum at the time for evaluation and weighting of these signal portions can be used and thus the quality of the output signal in which the optimum luminance and chrominance signal are combined in a standard manner can be further improved.

Any suitable criteria for evaluating signals may be employed with the present invention. For example, with color television signals, the magnitude of the noise level, the signal-to-noise ratio (of the signal level) or the occurrence of interference maybe be selectively used as criterion for evaluation of the quality of the input signals ($S_1 \ldots S_n$). Alternatively, for example, the presence of a deterministic signal portion may be used as the criterion for evaluation. Likewise, as will be appreciated, a combination of any of these, or other, criterion may be used to evaluate the quality of input signals ($S_1 \ldots S_n$).

Deterministic signal portions, for example, the horizontal and vertical synchronous information and the auxiliary color carrier in the current color television picture are predetermined, always present and prescribed signal components.

If the deterministic signal portions are absent or they are so faint that they cannot be detected, the pertinent input signal is preferably not evaluated nor relayed for weighting.

A presently preferred weighting scheme weights the input signals based on their rating compared the input signal which is rated the best.

According to the invention, an especially simple and economical evaluation of input signals is achieved by equating input signals which, compared to the input signal assessed as best, fall below a certain threshold to be weighted as a zero. Typically, these signals do not deliver a positive contribution to the output signal in the first place.

According to another aspect of the invention at least one further block of m input signals (for example, audio signals) are evaluated in the described manner in addition to the first block of n input signals (for example, video signals) in order to improve their quality likewise and/or relative to the best individual signal.

In accordance with the invention, in case of brief disruptions of reception during which the quality of all input signals cannot be used, the output signals may be buffered (after weighted summing) and the undisrupted signals received before the disruption are transmitted. As will be appreciated, this simple manner, without high cost, the situation where no signal reaches the reproduction part of the receiver, for example, a monitor, during these disruptions, is avoided.

According to another aspect of the invention, input signals which do not contribute to the improvement of the output signal are not simply weighted very low or with zero, but are tuned to another frequency range with the same useful information, for example, another television channel with the same program but better quality (frequency diversity).

It is another object of the invention to provide a circuit for carrying out the aforementioned process. According to this object of the invention there is provided a circuit comprising a synchronization unit for time synchronization of the and/or m digital input signals ($S_1 \ldots S_n$) consisting of one FIFO memory for each signal, a clock generator and a synchronization control unit. A signal conducting unit is provided in which each of the synchronized input signals ($S_1 \ldots S_n$) is supplied via a signal evaluation circuit and a following means (for forming weighting factors) and another FIFO memory with a storage depth which corresponds to the time interval of signal evaluation and formation of the weighting factors. A multiplication and summary means is connected to a reproduction part of a receiver.

BRIEF DESCRIPTION OF DRAWING

The FIGURE is a block diagram for a circuit for reception of broadcast signals according to the present invention.

DETAILED DESCRIPTION

The receiving means 1 for television reception in motor vehicles, for example in a passenger car, consists of a receiving unit 2, a synchronization unit 3 and a signal conditioning unit 4.

In the receiving unit 2 there are a number of different antennas, in this embodiment five different antennas 5, which are located at different points on the motor vehicle for receiving the same television program which can reach the antennas 5 as a result of the terrain structure by reflections on several propagation paths.

A tuner 6 tuned to the same useful signal in this example a (TV program) and a video decoder 7 are connected in series to each antenna 5. The tuners 6 can be tuned either to the same television channel or to different channels which transmit the same television program.

The synchronization unit 3 consists of one FIFO memory 8 each for each video signal delivered by the video decoders 7 and a clock generator 9 and a synchronization control unit 10.

In the signal conditioning unit 4 the output signals of the synchronization unit 3, therefore the input signals $S_1 \ldots S_5$ are delivered on the one hand via another FIFO memory 11 and on the other hand via an evaluation circuit 12 with a series-connected means 13 for determining the weighting factors to a multiplication and summing means 14 which is connected on the output side (optionally via a D/A converter) to a screen (not shown). The high frequency signal received by the antennas 5 is relayed to the series-connected tuners 6. The latter demodulate the respective television signal and make available the analogous FBAS signal at their outputs.

The video decoders 7 digitize these FBAS signals and separate the luminance and chrominance signal.

In addition to digital video data, the video decoders 7 deliver the pertinent clock and synchronization signals and status signals which show for example the presence of the color video carrier.

The receiving unit 2 thus makes available on five paths digital video data with the pertinent clock and synchronization data, these data of the individual paths being staggered in time to one another generally due to the different reception paths.

These time shifts are eliminated in the synchronization unit 3. To do this, in the clock generator 9 using a common system clock and in the synchronization control unit 10 using the n input synchronization signals, control signals are produced from the input clock signals control the FIFO memory such that, at their output, the digital video data are synchronized in time, and therefore have a common clock and synchronization signal.

These synchronized input signals $S_1 \ldots S_5$ are now subjected to the process in the signal conditioning unit 4. To do this, first the signal quality is assessed with respect to given criteria in the evaluation circuit 12 in parallel for all five paths. Then, the pertinent weighting factors are determined from the results of these signal evaluations in the means 13.

Then the five synchronized input signals $S_1 \ldots S_5$ are multiplied by the pertinent weighting factors in the multiplication and summing means 14 and these adaptively weighted signals are added to an output signal $S_A$ which is supplied to the screen optionally via a D/A converter. So that the correct video data are used for the adaptively weighted summing, specifically those which have already been used for evaluation and determination of the weighting factors, the input signals $S_1 \ldots S_5$ are delayed in a FIFO memory with a storage depth which corresponds to the time interval which is necessary for evaluation and determination of the weighting factor. In this example there is one video line at a time.

Summing of all adaptively weighted video signals ensures that the output television signal $S_A$ made available to the receiver in the least favorable case, i.e. when four input signals receive weighting zero, corresponds to the best of the five input signals and in all other cases has better quality.

The invention claimed is:

1. A process for mobile reception of television signals comprising:
   receiving a plurality of different input signals;
   time synchronizing said input signals using video synchronization pulses contained in said input signals;
   evaluating the quality of said input signals using at least one criterion for determining an adaptively determined weighting factor;
   weighting said input signals;
   deriving an output signal based on said weighted input signals; and
   feeding said output signal to a receiver.

2. The process of claim 1, wherein said video synchronization pulses are selected from the group consisting of horizontal video synchronization pulses and vertical synchronization pulses.

3. The process of claim 1, wherein said output signal is derived by summing said weighted input signals.

4. The process of claim 1, wherein said output signal is derived by summing said weighted input signals.

5. The process of claim 1, further comprising the step of delaying said input signals before deriving said output signal to allow determination of said weighting factors.

6. The process of claim 5, wherein a FIFO memory is used for said delay.

7. The process of claim 1, wherein said input signals are digital signals.

8. The process of claim 7, wherein each of said input signals is received with its own antenna and its own tuner.

9. The process of claim 8, wherein high frequency signals received with said antennas are already digitally modulated.

10. The process of claim 9, wherein said input signals comprise analog and digital signals having luminance and chrominance portions produced by video decoders serially connected to said tuners.

11. The process of claim 10, wherein said luminance and chrominance portions of each input signal is evaluated, weighted, and summed independently of one another.

12. The process of claim 1, wherein said criterion is selected from the group consisting of magnitude of noise level, signal-to-noise ratio of a signal level, and occurrence of interference.

13. The process of claim 12, wherein at least two of said criterion are used to evaluate the quality of said input signals.

14. The process of claim 1, wherein said criterion is based on a presence of a deterministic signal portion.

15. The process of claim 1, wherein said input signals are weighted relative to their rating as compared to the input signal having the highest rating for said criterion.

16. The process of claim 15, further comprising the step of setting a threshold rating relative to the input signal having the highest rating and assigning input signals falling below said threshold rating a weight factor of zero.

17. The process of claim 1, wherein said input signals are video signals and are received during said receiving step.

18. The process of claim 1, wherein after deriving said output signals, said output signals are buffered and undisrupted signals received before a period of interference are transmitted to said receiver.

19. The process of claim 1, further comprising the step of setting receiving paths for input signals not contributing to improving said output signal to different frequency ranges having the same information.

20. A circuit for allowing mobile reception of broadcast signals comprising:
- a receiving means for receiving a plurality of different input signals;
- a time synchronization means for time synchronization of the input signals using video synchronization pulses contained with the input signals;
- a signal conditioning means for evaluating the quality of the input signals using at least one criterion for determining an adaptively determined weighting factor;
- a determining means for weighting the input signals;
- a multiplication and summing means for forming output signals using the weighted input signals; and
- a receiver having a reproduction part in communication with an output of said multiplication and summing means.

* * * * *